(12) United States Patent
Harley et al.

(10) Patent No.: US 6,744,055 B2
(45) Date of Patent: Jun. 1, 2004

(54) MINIATURE PERSONAL AND AREA RADON AND THORON MONITOR

(75) Inventors: Naomi H. Harley, Hoboken, NJ (US); Passaporn Chittaporn, Hoboken, NJ (US)

(73) Assignee: New York University, New York, NY (US)

( * ) Notice: Subject to any disclaimer, the term of this patent is extended or adjusted under 35 U.S.C. 154(b) by 127 days.

(21) Appl. No.: 09/897,751

(22) Filed: Jun. 29, 2001

(65) Prior Publication Data

US 2002/0014596 A1 Feb. 7, 2002

Related U.S. Application Data

(60) Provisional application No. 60/214,973, filed on Jun. 29, 2000.

(51) Int. Cl.[7] .................................................. G01T 5/00
(52) U.S. Cl. .................... 250/472.1; 250/253; 250/255; 250/473.1; 250/475.2; 250/482.1
(58) Field of Search .......................... 250/472.1, 473.1, 250/475.2, 482.1, 253, 255

(56) References Cited

U.S. PATENT DOCUMENTS

| | | | |
|---|---|---|---|
| 4,385,236 A | 5/1983 | Hassib et al. ............ 250/472.1 |
| 4,800,272 A | 1/1989 | Harley et al. | |
| RE33,065 E | 9/1989 | Alter et al. .................. 250/253 |
| 4,926,053 A | 5/1990 | Dempsey et al. ........... 250/376 |
| 4,933,564 A | 6/1990 | Kiefer et al. ............. 250/473.1 |
| 4,948,970 A | 8/1990 | Port et al. .................... 250/253 |
| 4,975,574 A | * 12/1990 | Lucas .......................... 250/253 |
| 4,980,550 A | 12/1990 | Port et al. .................... 250/255 |
| 5,068,538 A | 11/1991 | Harley | |
| 5,093,570 A | 3/1992 | Dorfi et al. | |
| 5,134,297 A | 7/1992 | Harley et al. | |
| 5,179,285 A | 1/1993 | Langner, Jr. | |

* cited by examiner

*Primary Examiner*—Constantine Hannaher
(74) *Attorney, Agent, or Firm*—Darby & Darby

(57) ABSTRACT

A Rn222 (radon) and Rn220 (thoron) radiation monitor that uses alpha-track detection film in multiple, separate chambers to detect radiation, wherein different diffusion barriers are used in each of the chambers to allow for signal differentiation between the chambers. The signal differentiation allows for differentiation between the levels of thoron and radon in the atmosphere tested. The radiation monitor may have three or four separate chambers, each with an electrically conductive housing and a cap with at least one opening to permit entry of ambient air. Inside each of the housings is an alpha-track detecting film, such as a solid-state nuclear track detector (SSNTD), with a thin electrically conducting cover. In one or more of the chambers is a diffusion barrier and seal placed within the housing to generally isolate the detecting film from thoron radiation in the housing.

28 Claims, 5 Drawing Sheets

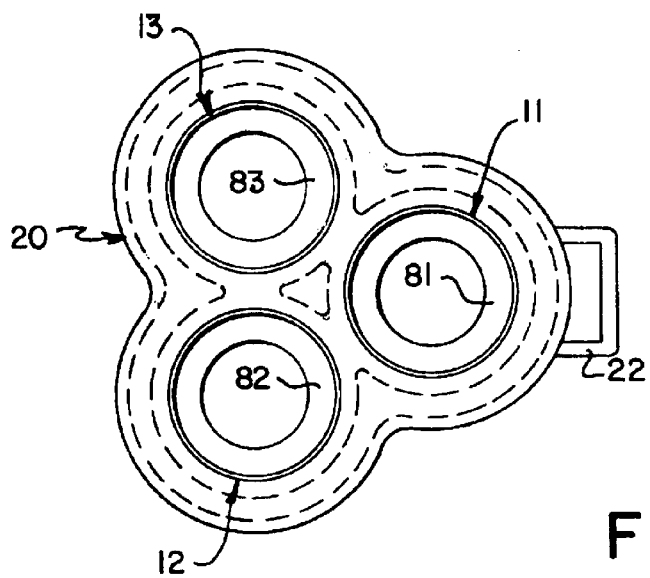
FIG. 3B
FIG. 3C
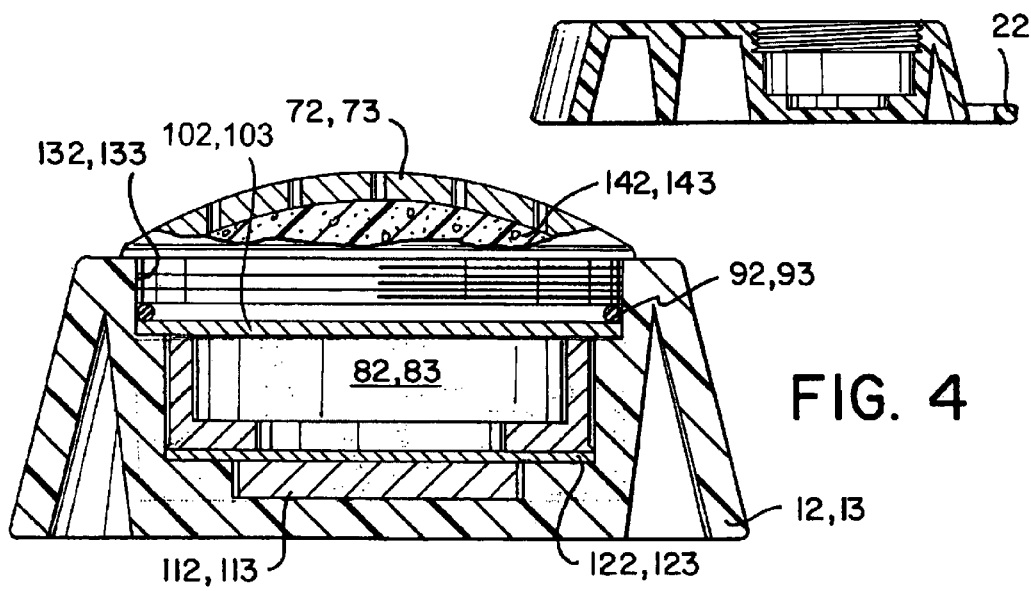
FIG. 4
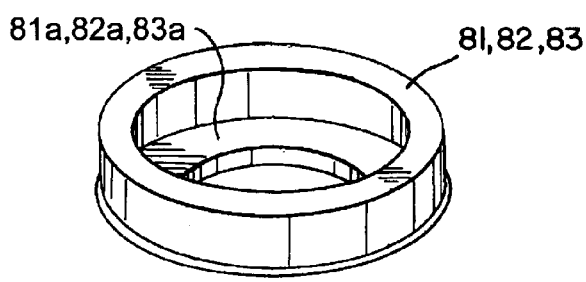
FIG. 4A
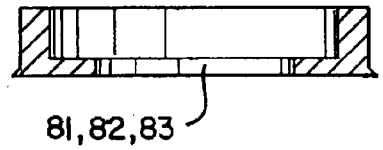
FIG. 4B

MINIATURE PERSONAL AND AREA RADON AND THORON MONITOR

RELATED APPLICATIONS

The present application relates to U.S. Provisional Patent Application Ser. No. 60/214,973 filed on Jun. 29, 2000, having common inventorship and assignee as the present application and incorporated herein by reference, to which priority is claimed. The present application also relates to U.S. Pat. Nos. 4,800,272, 5,068,538 and 5,134,297, having common inventorship and assignee as the present application.

FIELD OF THE INVENTION

The invention relates to the detection of environmental alpha particle radiation and, more particularly, a novel miniature detector of radon and thoron gas concentrations for personal or area use.

BACKGROUND OF THE INVENTION

Radon gas is a decay product of the element radium-226 which is found in soils and rocks which can diffuse through physical cracks and soil pores and enter the breathable atmosphere. Structures such as homes and other buildings can trap the radon gas inside them because of typically low air ventilation rates. Concentrations of radon gas as a result can rise to high concentrations which adversely affect the health of people who come in contact therewith.

In general, continuous radon detection instrumentation is costly, large and requires electric power. Such detection equipment is also known to often require operation by highly skilled technicians, and is generally used for research purposes. As a result, integrating radon monitors have been developed in the art, as disclosed in U.S. Pat. No. 4,800,272 (Harley et al.), U.S. Pat. No. 5,068,538 (Harley) and U.S. Pat. No. 5,134,297 (Harley et al.), all of which have common inventorship and assignee as the present application and are incorporated herein by reference.

Thoron (radon-220) is a decay product of the elements thorium and radium-224. Environmental cleanup or removal of radium and thorium, which are the sources of the two radioactive isotopes of radon, is often performed in the art. A high concentration of thoron which can be detrimental to the health of the people who come in contact therewith. It has not yet been feasible in the art to undertake large-scale radon and thoron measurement programs to determine the actual effects of different environmental levels of radon and thoron exposure in private residences and commercial buildings on a particular person or particular group of people. Furthermore, it is very difficult to measure thoron gas because it has a very short half life (t½=55 seconds). There is thus a general need in the art for a compact, low cost and portable radon and thoron detector for personal or area use. Because of the presence of the two radioactive isotopes of radon, there is a need in the art for a method and apparatus of accurate personal exposure assessment with respect to hazardous concentration levels.

SUMMARY OF THE INVENTION

The present invention relates to a $Rn^{222}$ (radon) and $Rn^{220}$ (thoron) radiation monitor that uses alpha-track detection film in multiple, separate chambers to detect radiation. The invention further describes use of different diffusion barriers in each of the chambers to allow for signal differentiation between the chambers. The signal differentiation allows for differentiation between the levels of thoron and radon in the atmosphere tested.

In a preferred embodiment of the invention, the radiation monitor has three or four separate chambers, each with an electrically conductive housing and a cap with at least one opening to permit entry of ambient air. Inside each of the housings is an alpha-track detecting film, such as a solid-state nuclear track detector (SSNTD), with a thin electrically conducting cover. In one or more of the chambers is a diffusion barrier and seal placed within the housing to generally isolate the detecting film from thoron radiation in the housing. Use of diffusion barriers with different diffusion rates or properties allows for signal differentiation so that a specific measurement can be made of thoron levels separate from the radon levels present in the atmosphere tested.

In particular, the radiation monitor according to a specific embodiment of the invention comprises a first chamber, a second chamber and a third chamber. The first chamber comprises an electrically conductive housing having walls defining an internal volume of space, and at least one hole (or a plurality of holes) through a cap of the housing for permitting entry of ambient air into the internal volume of space. The first chamber further includes a solid state nuclear track detector (SSNTD) disposed within the housing with a thin electrically conducting cover. The second chamber comprises an electrically conductive housing having walls defining an internal volume of space, and at least one hole (or a plurality of holes) through a cap of the housing for permitting entry of ambient air into the internal volume of space. The second chamber further comprises a solid state nuclear track detector (SSNTD) disposed within the housing with a thin electrically conducting cover, and a diffusion barrier within the housing where the solid state nuclear track detector (SSNTD) is generally isolated from thoron radiation in the internal volume of space. The third chamber comprises an electrically conductive housing having walls defining an internal volume of space, and at least one hole (or a plurality of holes) through a cap of the housing for permitting entry of ambient air into the internal volume of space. The third chamber further comprises a solid state nuclear track detector (SSNTD) disposed within the housing with a thin electrically conducting cover, and a diffusion barrier within the housing, where the solid state nuclear track detector (SSNTD) is generally isolated from thoron radiation in the internal volume of space.

The radiation monitor according to yet another embodiment of the invention comprises four chambers, namely a first chamber, a second chamber, a third chamber and a fourth chamber arranged in a four-lobe manner. The four-chamber embodiment of the radiation monitor according to the invention advantageously achieves a more accurate radiation measurement because of the two pairs of chambers allow for measurement data comparison and data uncertainty calculations. The first pair of chambers includes one chamber without diffusion barriers and another chamber with a diffusion barrier. The second pair of chambers similarly includes one chamber without diffusion barriers and another chamber with a diffusion barrier.

In particular, in the four-chamber embodiment of the radiation monitor according to the invention, the first chamber comprises an electrically conductive housing having walls defining an internal volume of space, and at least one hole (or a plurality of holes) through a cap of the housing for permitting entry of ambient air into the internal volume of space. The first chamber further includes a solid state nuclear track detector (SSNTD) disposed within the housing with a thin electrically conducting cover. The second chamber comprises an electrically conductive housing having walls defining an internal volume of space, and at least one hole (or a plurality of holes) through a cap of the housing for permitting entry of ambient air into the internal volume of space. The second chamber further comprises a solid state nuclear track detector (SSNTD) disposed within the housing with a thin electrically conducting cover, and a diffusion barrier within the housing, where the solid state nuclear track detector (SSNTD) is generally isolated from thoron radiation in the internal volume of space.

In the second pair of chambers of the four-chamber embodiment of the radiation monitor according to the invention, the third chamber comprises an electrically conductive housing having walls defining an internal volume of space, and at least one hole (or a plurality of holes) through a cap of the housing for permitting entry of ambient air into the internal volume of space. The third chamber further includes a solid state nuclear track detector (SSNTD) disposed within the housing with a thin electrically conducting cover. The fourth chamber comprises an electrically conductive housing having walls defining an internal volume of space, and at least one hole (or a plurality of holes) through a cap of the housing for permitting entry of ambient air into the internal volume of space. The fourth chamber further comprises a solid state nuclear track detector (SSNTD) disposed within the housing with a thin electrically conducting cover, and a diffusion barrier within the housing, where the solid state nuclear track detector (SSNTD) is generally isolated from thoron radiation in the internal volume of space.

BRIEF DESCRIPTION OF THE DRAWINGS

These and other features, aspects, and advantages of the invention will become more readily apparent with reference to the following detailed description of a presently preferred, but nonetheless illustrative, embodiment when read in conjunction with the accompanying drawings, in which like reference designations represent like features throughout the enumerated Figures. The drawings referred to herein will be understood as not being drawn to scale, except if specifically noted, the emphasis instead being placed upon illustrating the principles of the invention. In the accompanying drawings:

FIGS. 3A, 3B and 3C are diagrams respectively illustrating the perspective, top and side views (along with related dimensions) of an embodiment of the radon and thoron monitor according to the invention without the caps covering the three chambers;

FIG. 4 is a diagram illustrating a cross-sectional view of the chambers with diffusion barriers and O-ring seals in an embodiment of the radon and thoron monitor according to the invention;

FIGS. 4A, 4B and 4C are diagrams respectively illustrating the perspective, side and top views (along with related dimensions) of the O-shaped insert in an embodiment of the radon and thoron monitor according to the invention;

DETAILED DESCRIPTION OF THE PREFERRED EMBODIMENTS

Figure 1:
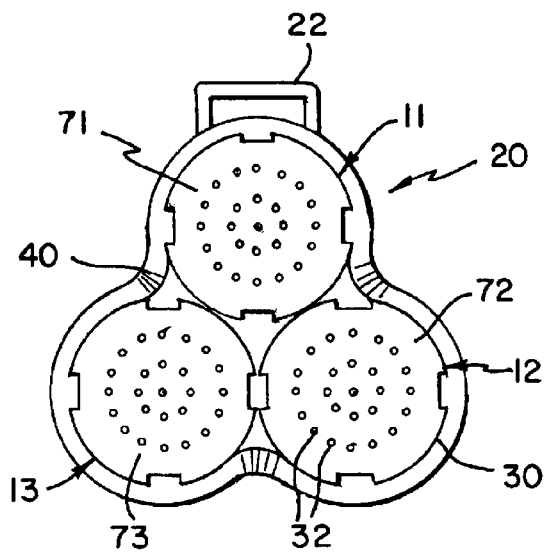
FIGS. 1 and 2 are diagrams respectively illustrating the top plan and perspective views of an embodiment of the radon and thoron monitor according to the invention.
Figure 2:
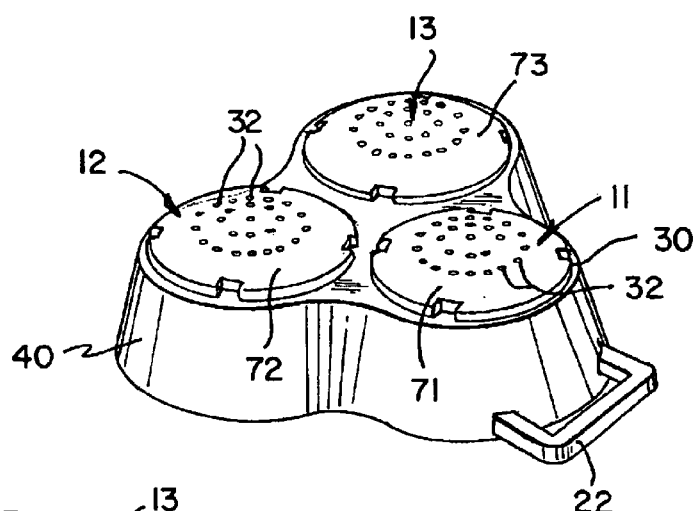

Referring generally to FIGS. 1 and 2, the top plan and perspective views of an embodiment of a personal radon and thoron monitor according to the principles of the invention are respectively shown. The monitor 20 comprises three chambers 11, 12 and 13 arranged in a trilobed manner, each having a generally cylindrical or circular housing. The monitor 20 according to an embodiment of the invention has a face diameter of approximately 5 cm and a thickness of about 2 cm. Section 30 is a set of the three caps 71, 72 and 73. The monitor 20 has a bottom section 40, which together with section 30, the caps 71, 72 and 73, respectively cover the top of the three chambers 11, 12 and 13. An eye or fastening portion 22 is advantageously integrally molded to the housing of one of the chambers 11, 12 and 13 for attachment of a lanyard, strap, chain or similar fastening means so as to permit the monitor 20 to be worn by a person whose radon and thoron exposure level is to be measured. The fastening portion 22 is here shown as attached to chamber 11, but such can be located anywhere on the monitor 20, e.g., chambers 12 or 13, in allowing the monitor 20 to be worn by a person or used as an area monitor. The housing is preferably molded from conducting ABS(CNi) plastic, i.e., plastic with embedded nickel coated carbon fibers. The bottom section 40 and fastening portion 22 are molded together in one piece. The housing may also be fabricated from aluminum sheet or any other suitable electrically conductive material capable of shielding the inside of the housing from radon and thoron radiation.

Each of the caps 71, 72 and 73 includes a plurality of openings or through-holes 32 for permitting ambient air passively enter the monitor 20. This passive diffusion mechanism requires no special equipment, such as pumps or power supplies, to induce air flow into the housing. Each of the chambers 11, 12 and 13 also includes a solid state nuclear track detector (SSNTD) disposed within the internal volume of space. A preferred embodiment of the SSNTD includes a 9×9 mm square solid state nuclear track film (CR-39) or LR 115 made of cellulose acetate. All gases are allowed to enter the internal volume of space in chamber 11, including ambient air and radon. All gases are allowed to enter the internal volume of space in chambers 12 and 13, except thoron. This is accomplished by disposing a diffusion barrier and an O-ring shaped seal (described below) in each of the chambers 12 and 13. Measurement can then be taken with respect to the signal differential between chambers 11, 12 and 13 in monitoring radon and thoron radiation.

Figure 3A:
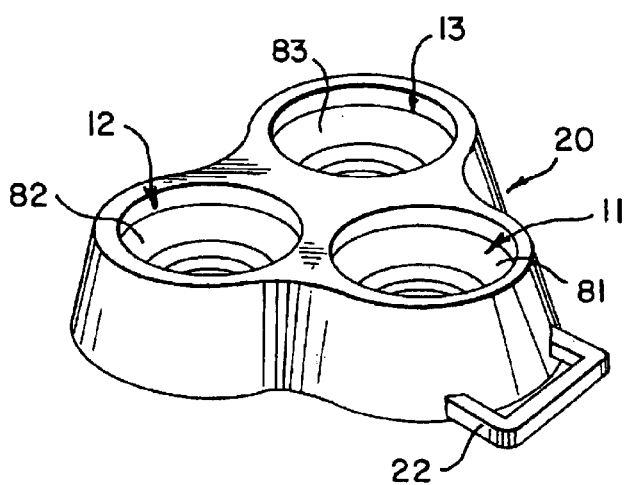

FIGS. 3A, 3B and 3C are diagrams respectively illustrating the perspective, top and side views of an embodiment of the monitor 20 without the caps covering the three chambers 11, 12 and 13. FIGS. 3B and 3C also show the dimensions of the particular embodiment of the monitor according to the invention. O-shaped inserts 81, 82 and 83, made of ABS (CNi), are respectively disposed in the chambers 11, 12 and 13 to hold the SSNTD film and a covering thin aluminum MYLAR® (e.g., aluminized polyester) sheet in place. A diffusion barrier is also disposed in each of the chambers 12 and 13 to prohibit entry of thoron thereto, which is further described below. An O-ring seal sits on top of each of the O-shaped inserts 81, 82 and 83 and serves to prevent air leakage around their corresponding diffusion barrier (if any).

FIG. 4 is a diagram illustrating a cross-sectional view of chambers 12 and 13 in an embodiment of the monitor 20 according to the invention. From bottom to top, the chamber (12 or 13) comprises an SSNTD film (112 or 113), a metallized MYLAR® sheet (122 or 123), an O-shaped insert (82 or 83), a diffusion barrier (102 or 103), an O-ring seal (92 or 93), a cap or 73) with a conducting foam (142 or 143), and a screw thread closure (132 or 133) for receiving the cap. The conducting foam prevents entry of the radon and thoron decay products and protects the detection chamber from nuisance dust. The diffusion barrier serves to prevent entry of thoron into the chambers 12 and 13, which is made of numerous materials, including electrically conducting 3 mil MYLAR® film. The metallized MYLAR® sheet covers the SSNTD to maintain an electrically conducting interior. The preferred SSNTD film according to the invention is a 9×9 millimeter film of allyl diglycol carbonate, commercially available under the designation "CR-39" with a preferred thickness of 0.9 millimeters. Another embodiment of the SSNTD film is a film made of cellulose acetate, commercially available under the designation "LR115." The metallized sheet serves to maintain electrical conductivity and as a protective cover to protect the SSNTD from visible light and dust. In the preferred embodiment of the monitor 20, the metallized sheet comprises a thin layer of aluminized MYLAR® having a weight of, e.g., 1.7 milligrams per square centimeter.

The metallized sheet is electrically conductive. There is also an absence of electrical charge on other components of the monitor 20. It has been found that the presence of electrical charge on the sheet causes severe concentrations of nuclear damage tracks on the SSNTD. These track concentrations were seen to occur to such a degree That track counting is most difficult, and may even be rendered impossible in some cases. Because the metallized MYLAR® sheet does not hold an electrical charge, the radiation damage tracks are generally uniformly distributed over the SSNTD film and the calibration of the SSNTD is generally constant and predictable in all environments.

Figure 4C:
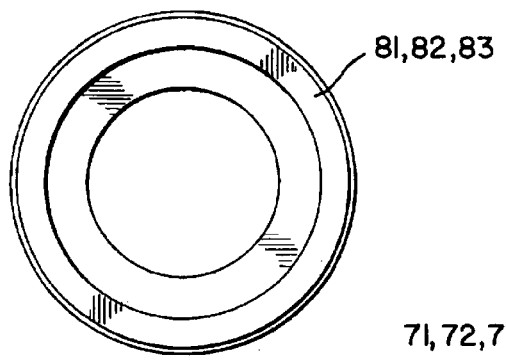

FIGS. 4A, 4B and 4C are diagrams respectively illustrating the perspective, side and top views of the O-shaped insert (81, 82 or 83) in an embodiment of the monitor 20. FIG. 4B also shows the dimensions of the particular embodiment of the O-shaped insert. The O-shaped insert (81, 82 or 83) is preferably molded from conducting ABS (CNi) plastic, i.e., plastic with embedded nickel coated carbon fibers. The housing may also be fabricated from aluminum sheet or any other suitable electrically conductive material capable of shielding the inside of the housing from radon and thoron radiation. The O-shape insert also includes an inward circular base extension (81a, 82a or 83a) for fitting into the chamber and supporting the O-ring seal (and the diffusion barrier, if needed).

Figure 5A:
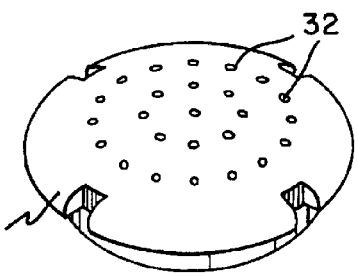
FIGS. 5A, 5B and 5C are diagrams respectively illustrating the perspective, side and top views (along with related dimensions) of the cap covering each of the three chambers in an embodiment of the radon and thoron monitor according to the invention.
Figure 5:
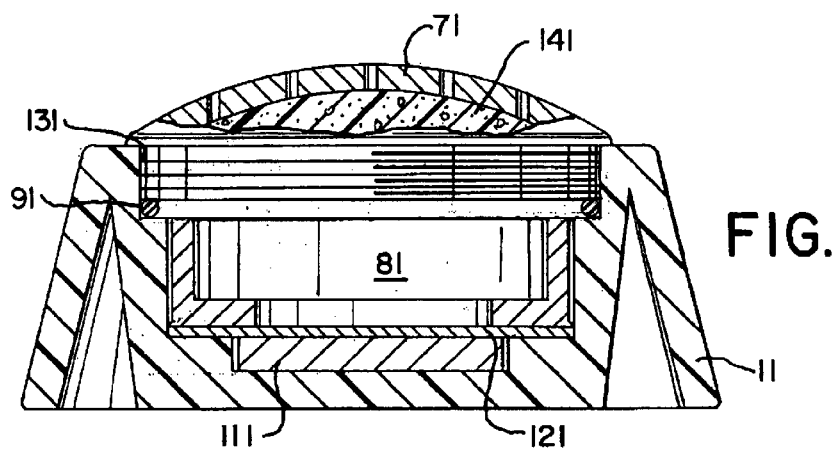
FIG. 5 a diagram illustrating a cross-sectional view of another chamber without diffusion barriers in an embodiment of the radon and thoron monitor according to the invention.

FIG. 5 a diagram illustrating a cross-sectional view of chamber 11 in an embodiment of the monitor 20 according to the invention. Chamber 11 is generally the same as chambers 12 and 13 as shown in FIG. 4, except that chamber 11 does not include the diffusion barrier. From bottom to top, the chamber 11 comprises an SSNTD film 111, a metallized MYLAR® sheet 121, an O-shaped insert 81, an O-ring seal 91, a cap 71 with a conducting foam 141, and a screw thread closure 131 for receiving the cap 71. The conducting foam prevents entry of the radon and thoron decay products and protects the detection chamber from nuisance dust. The metallized MYLAR® sheet 121 covers the SSNTD 111 to maintain an electrically conducting interior. The preferred SSNTD film according to the invention is a 9×9 millimeter film of allyl diglycol carbonate, commercially available under the designation "CR-39" with a preferred thickness of 0.9 millimeters. The metallized sheet 121 serves as a protective cover to protect the SSNTD 111 from visible light and dust. In the preferred embodiment of the monitor 20, the metallized sheet 121 comprises a thin layer of aluminized MYLAR® having a weight of, e.g., 1.7 milligrams per square centimeter.

This particular embodiment of the monitor 20 configures chamber 11 without the diffusion barrier and chambers 12 and 13 including diffusion barriers. Other embodiments include a monitor having two chambers without the diffusion barrier and one chamber including the diffusion barrier, or a monitor with diffusion barriers for all the chambers, or a monitor with no diffusion barrier for any of the chambers.

Figure 5B:
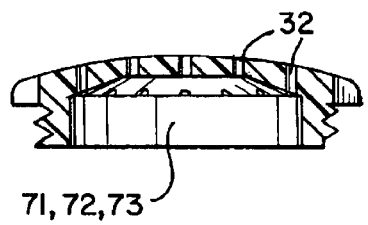
Figure 5C:
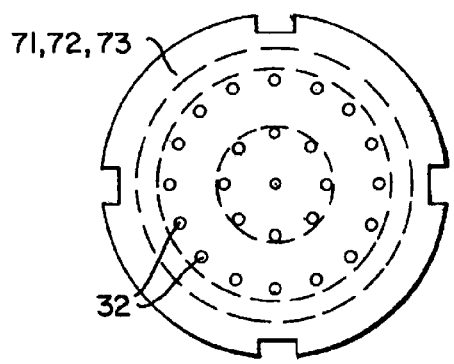

FIGS. 5A, 5B and 5C are diagrams respectively illustrating the perspective, side and top views of an embodiment of the caps covering one of the three chambers (11, 12 and 13) in an embodiment of the monitor 20. FIGS. 5B and 5C also show the dimensions of the particular embodiment of the cap. The cap (71, 72 or 73) includes a plurality of openings or through-holes 32 for permitting ambient air passively enter the monitor 20. The cap (71, 72 or 73), which covers the top of a corresponding chamber (11, 12 or 13), is preferably molded from conducting ABS (CNi) plastic, i.e., plastic with embedded nickel coated carbon fibers. The housing may also be fabricated from aluminum sheet or any other suitable electrically conductive material capable of shielding the inside of the housing from radon and thoron radiation. The cap also includes a conducting foam (not shown in FIGS. 5A, 5B and 5C), such as conductive urethane, polyurethane, or polystyrene foam, which is located at the inside surface of the top section 30 of all of the chambers 11, 12 and 13.

Figure 6A:
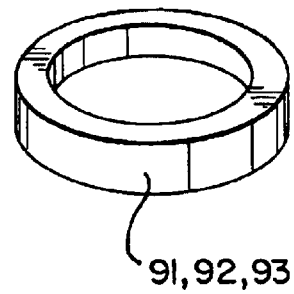
FIGS. 6A and 6B are diagrams respectively illustrating the perspective and top views of another embodiment of the O-shaped insert of the radon and thoron monitor according to the invention.
Figure 6B:
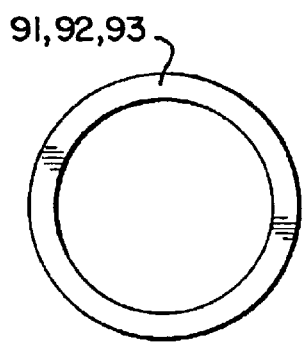

FIGS. 6A and 6B are diagrams respectively illustrating the perspective and top views of another embodiment of the O-shaped insert (81, 82 or 83) in an embodiment of the monitor 20. The O-ring seal (91, 92 or 93) sits on top of each of the O-shaped inserts 81, 82 and 83 and serves to prevent air leakage around their corresponding diffusion barrier (if any).

In a preferred embodiment according to the invention, after exposure in the radon and thoron test chambers of monitor 20 the SSTND film is etched in 6 N KOH overnight to reveal the alpha particle tracks as shallow pits. The tracks are scored either by image analysis, or visually after enlarging the 9×9 mm area with a microfiche reader and printing to a standard hard copy paper image (about 23×). The image analysis technique scores the tracks directly from each film using a microscope, and a data translation frame grabber and image analysis program. Track counting is normally performed using image analysis with about 20% of samples also scored visually for quality assurance. Pristine nuclear track film and exposed positive controls are etched with each batch of research or field samples for quality control.

Figure 7:
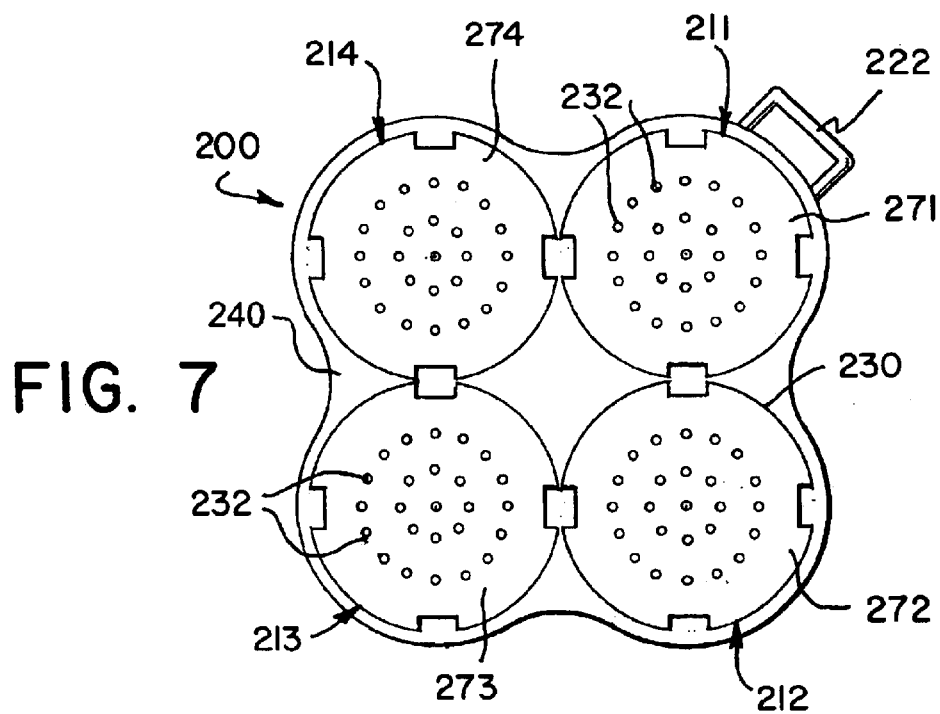
FIG. 7 is a diagram illustrating the top view of a four-chamber radon and thoron monitor according to the invention.

The monitor 20 according to the invention is not limited to the three-chamber embodiment described herein. FIG. 7 is a diagram illustrating the top view of a four-chamber radon and thoron monitor 200 according to the invention. Each of the chambers 211, 212, 213 and 214, arranged in a four-lobe manner, is generally the same as the chambers 11, 12 and 13 of the monitor 20 described above. One embodiment of the monitor 200 provides a diffusion barrier for each of the chambers 211 and 212 only, which is suitable for providing duplicate measurement of radon and thoron radiation. The four-chamber embodiment of the radiation monitor according to the invention advantageously achieves a more accurate radiation measurement because of the two pairs of chambers allow for measurement data comparison and data uncertainty calculations. The first pair of chambers includes one chamber without diffusion barriers and another chamber with a diffusion barrier. The second pair of chambers similarly includes one chamber without diffusion barriers and another chamber with a diffusion barrier.

In particular, in the first pair of chambers of the four-chamber embodiment of the radiation monitor according to the invention, the first chamber comprises an electrically conductive housing having walls defining an internal volume of space, and at least one hole (or a plurality of holes) through a cap of the housing for permitting entry of ambient air into the internal volume of space. The first chamber further includes a solid state nuclear track detector (SSNTD) disposed within the housing with a thin electrically conducting cover. The second chamber comprises an electrically conductive housing having walls defining an internal volume of space, and at least one hole (or a plurality of holes) through a cap of the housing for permitting entry of ambient air into the internal volume of space. The second chamber further comprises a solid state nuclear track detector (SSNTD) disposed within the housing with a thin electrically conducting cover, and a diffusion barrier within the housing, where the solid state nuclear track detector (SSNTD) is generally isolated from thoron radiation in the internal volume of space. In the present embodiment, the second chamber further includes a seal (such as an O-ring seal) around the diffusion barrier for generally isolating the SSNTD from thoron radiation in the internal volume of space.

In the second pair of chambers of the four-chamber embodiment of the radiation monitor according to the invention, the third chamber comprises an electrically conductive housing having walls defining an internal volume of space, and at least one hole (or a plurality of holes) through a cap of the housing for permitting entry of ambient air into the internal volume of space. The third chamber further includes a solid state nuclear track detector (SSNTD) disposed within the housing with a thin electrically conducting cover. The fourth chamber comprises an electrically conductive housing having walls defining an internal volume of space, and at least one hole (or a plurality of holes) through a cap of the housing for permitting entry of ambient air into the internal volume of space. The fourth chamber further comprises a solid state nuclear track detector (SSNTD) disposed within the housing with a thin electrically conducting cover, and a diffusion barrier within the housing, where the solid state nuclear track detector (SSNTD) is generally isolated from thoron radiation in the internal volume of space. In the present embodiment, the fourth chamber further includes a seal (such as an O-ring seal) around the diffusion barrier for generally isolating the SSNTD from thoron radiation in the internal volume of space.

However, other embodiments of the monitor 200 include a monitor having three chambers without the diffusion barrier and one chamber including the diffusion barrier, a monitor having one chamber without the diffusion barrier and three chambers including the diffusion barrier, a monitor with diffusion barriers for all the chambers, or a monitor with no diffusion barrier for any of the chambers.

Referring again to FIG. 7, the monitor 200 includes a section 230 is a set of the four caps 271, 272, 273, and 274. The monitor 200 has a bottom section 240, which together with section 230, the caps 271, 272, 273 and 274, respectively cover the top of the four chambers 211, 212, 213 and 214. An eye or fastening portion 222 is advantageously integrally molded to the housing of one of the chambers 211, 212, 213 and 214 for attachment of a lanyard, strap, chain or similar fastening means so as to permit the monitor 20 to be worn by a person whose radon and thoron exposure level is to be measured or used as an area monitor. The fastening portion 222 is here shown as attached to chamber 211, but such can be located anywhere on the monitor 200, e.g., chambers 212, 213 or 214, in allowing the monitor 200 to be worn by a person. The housing is preferably molded from conducting ABS (CNi) plastic, i.e., plastic with embedded nickel coated carbon fibers. The bottom section 240 and fastening portion 222 are molded together in one piece. The housing may also be fabricated from aluminum sheet or any other suitable electrically conductive material capable of shielding the inside of the housing from radon and thoron radiation.

Each of the caps 271, 272, 273 and 274 includes a plurality of openings or through-holes 232 for permitting ambient air passively enter the monitor 200. This passive diffusion mechanism requires no special equipment, such as pumps or power supplies, to induce air flow into the housing. Each of the chambers 211, 212, 213 and 214 also includes a solid state nuclear track detector (SSNTD) disposed within the internal volume of space. A preferred embodiment of the SSNTD includes a 9×9 mm square solid state nuclear track film (CR-39).

Figure 8:
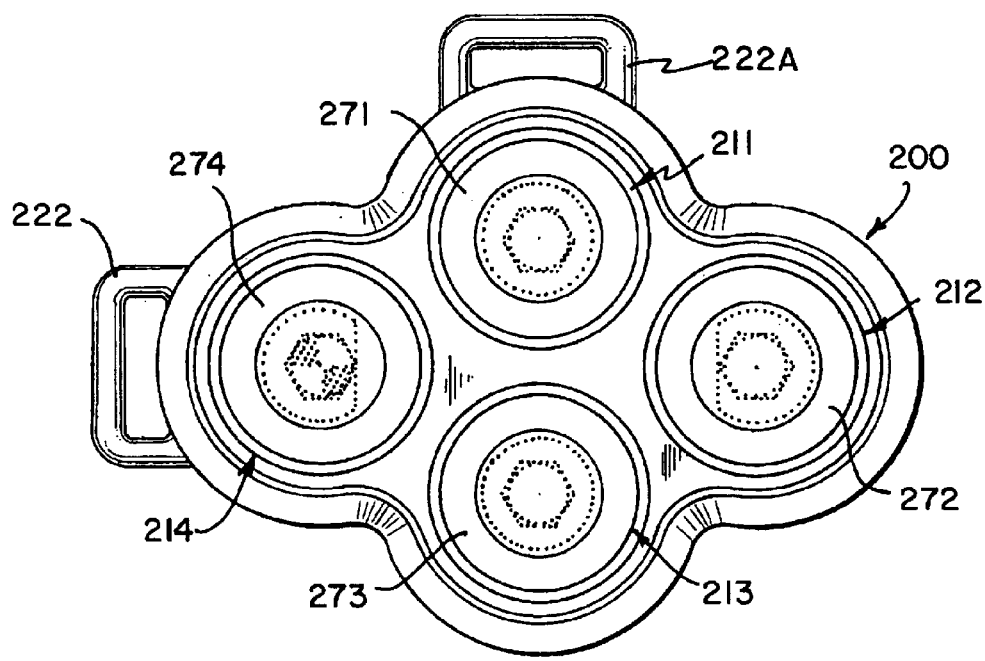
FIG. 8 is a diagram illustrating the top view of another four-chamber radon and thoron monitor according to the invention.
Figure 9:
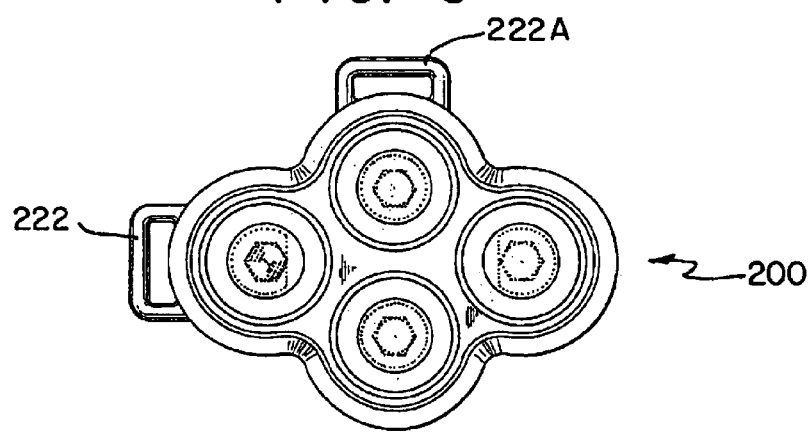
FIG. 9 is another diagram illustrating the four-chamber radon and thoron monitor according to the invention, as shown in FIG. 8 and generally drawn to scale.

FIG. 8 is a diagram illustrating the top view of another embodiment of the four-chamber radiation monitor according to the invention. The radiation monitor 200 shown in FIG. 8 is generally the same as the one shown in FIG. 7, except that the one shown in FIG. 8 includes an additional fastening portion 222A for convenient usage by the wearer of the radiation monitor 200. The additional fastening portion 222A has a structure generally the same as that of the fastening portion 222, as shown in FIG. 7. FIG. 9 is another diagram illustrating the four-chamber radon and thoron monitor according to the invention, as shown in FIG. 8 and generally drawn to scale to an actual implementation of an embodiment thereof.

The four-chamber embodiment of the radiation monitor according to the invention (as shown in, e.g., FIGS. 7, 8 and 9) allows for more accurate monitoring and measurement of radiation. Each of the two chamber pairs independently measures the radiation in the same area. That is, the first and second chambers in the first pair provide radiation monitoring and measurement independently from the third and fourth chambers in the second pair which also provide their own radiation measurement. This in effect provides at least two samples of measurement data on the radiation in the area. The measurement data of the first and second pairs (and their difference, if any) can then be considered in calculating the data uncertainty of the radiation measurement in that area.

Although the invention has been particularly shown and described in detail with reference to the preferred embodiments thereof, the embodiments are not intended to be exhaustive or to limit the invention to the precise forms disclosed herein. It will be understood by those skilled in the art that many modifications in form and detail may be made therein without departing from the spirit and scope of the invention. All such modifications are intended to be encompassed within the scope of the invention, which is defined by the following claims and their equivalents.

We claim:

1. A radiation monitor comprising:
   (a) a first chamber comprising:
      a first electrically conductive housing having walls defining an internal volume of space;
      a cap covering the first housing; said cap having at least one hole for permitting entry of ambient air into the internal volume of space and conducting foam for preventing entry of dust therein; and
      a first solid state nuclear track detector (SSNTD) disposed within the first housing with a first thin electrically conducting cover;
   (b) a second chamber comprising:
      a second electrically conductive housing having walls defining an internal volume of space;
      a cap covering the second housing; said cap having at least one hole for permitting entry of ambient air into the internal volume of space and conducting foam for preventing entry of duct therein; and
      a second solid state nuclear track detector (SSNTD) disposed within the second housing with a second thin electrically conducting cover; and
      a diffusion barrier within the second housing for blocking thoron radiation;
      wherein the second solid state nuclear track detector (SSNTD) is isolated from thoron radiation in the internal volume of space of the second housing;
   (c) a third chamber comprising:
      a third electrically conductive housing having walls defining an internal volume of space;
      a cap covering the third housing; said cap having at least one hole for permitting entry of ambient air into the internal volume of space and conducting foam for preventing entry of duct therein;
      a third solid state nuclear track detector (SSNTD) disposed within the third housing with a third thin electrically conducting cover; and
      a diffusion barrier within the third housing for blocking thoron radiation;
      wherein the third solid state nuclear track detector (SSNTD) is isolated from thoron radiation in the internal volume of space of the third housing.

2. The monitor of claim 1 wherein the second chamber further comprises a seal around the diffusion barrier for ensuring isolation of the second solid state nuclear track detector (SSNTD) from thoron radiation in the internal volume of space of the second housing.

3. The monitor of claim 2 wherein the seal is an O-ring seal.

4. The monitor of claim 2 wherein the second chamber further comprises an O-shaped insert for holding the seal in place.

5. The monitor of claim 1 wherein the third chamber further comprises a seal around the diffusion barrier for ensuring isolation of the third solid state nuclear track detector (SSNTD) from thoron radiation in the internal volume of space of the third housing.

6. The monitor of claim 5 wherein the seal is an O-ring seal.

7. The monitor of claim 5 wherein the third chamber further comprises an O-shaped insert for holding the seal in place.

8. The monitor of claim 1 further comprising a fastening portion provided on one of the first housing, the second housing and the third housing.

9. The monitor of claim 1 wherein there is generally no electrical charge present on the radiation monitor.

10. The monitor of claim 1 wherein the first, second and third chambers are arranged in a trilobed manner.

11. The monitor of claim 1 wherein the first housing, the second housing and the third housing are cylindrically shaped.

12. The monitor of claim 1 wherein each of the first housing, the second housing and the third housing is made from an electrically conductive material that shields the inside of the housing from radiation.

13. The monitor of claim 1 wherein the first housing, the second housing and the third housing are molded from conducting plastic with embedded nickel coated carbon fibers.

14. The monitor of claim 1 wherein each of the first SSNTD, the second SSNTD and the third SSNTD further comprises a solid state nuclear track film.

15. The monitor of claim 1 wherein each of the first SSNTD, the second SSNTD and the third SSNTD further comprises a solid state nuclear track film made of allyl diglycol carbonate.

16. The monitor of claim 1 wherein each of the first SSNTD, the second SSNTD and the third SSNTD further comprises a solid state nuclear track film made of cellulose acetate.

17. The monitor of claim 1 further comprising:
   (a) a fourth chamber comprising:
      a fourth electrically conductive housing having walls defining an internal volume of space;
      a cap covering the forth housing; said cap having at least one hole for permitting entry of ambient air into the internal volume of space and conducting foam for preventing entry of dust therein; and
      a fourth solid state nuclear track detector (SSNTD) disposed within the fourth housing with a fourth thin electrically conducting cover.

18. The monitor of claim 17 further comprising a fastening portion and an additional fastening portion respectively provided on two of the first housing, the second housing, the third housing and the fourth housing.

19. The monitor of claim 17 further comprising a fastening portion provided on one of the first housing, the second housing, the third housing and fourth housing.

20. The monitor of claim 17 wherein there is generally no electrical charge present on the radiation monitor.

21. The monitor of claim 17 wherein the first, second, third and fourth chambers are arranged in a four-lobe manner.

22. The monitor of claim 17 the first housing, the second housing, the third housing and the fourth housing are cylindrically shaped.

23. The monitor of claim 17 wherein each of the first housing, the second housing, the third housing and the fourth housing is made from an electrically conductive material that shields the inside of the housing from radiation.

24. The monitor of claim 17 wherein the first housing, the second housing, the third housing and the fourth housing are molded from conducting plastic with embedded nickel coated carbon fibers.

25. The monitor of claim 17 wherein each of the first SSNTD, the second SSNTD, the third SSNTD and the fourth SSNTD further comprises a solid state nuclear track film.

26. The monitor of claim 17 wherein each of the first SSNTD, the second SSNTD, the third SSNTD and the fourth SSNTD further comprises a solid state nuclear track film made of allyl diglycol carbonate.

27. The monitor of claim 17 wherein each of the first SSNTD, the second SSNTD, the third SSNTD and the fourth SSNTD further comprises a solid state nuclear track film made of cellulose acetate.

28. The monitor of claim 17 wherein the first chamber and the second chamber comprise a first chamber pair for monitoring radiation and providing radiation measurement data; and the third chamber and the fourth chamber comprise a second chamber pair for monitoring radiation and providing radiation measurement data;

wherein radiation measurement data uncertainty is calculated based on the measurement data provided by the first and second chamber pairs.

* * * * *

UNITED STATES PATENT AND TRADEMARK OFFICE
CERTIFICATE OF CORRECTION

PATENT NO. : 6,744,055 B2
DATED : June 1, 2004
INVENTOR(S) : Naomi Harley et al.

It is certified that error appears in the above-identified patent and that said Letters Patent is hereby corrected as shown below:

Title page,
Item [54], Title, delete "MINIATURE PERSONAL AND AREA RADON AND THORON MONITOR" and substitute -- MINIATURE PERSONAL AND AREA RADON AND THORON MONITOR RELATED APPLICATIONS --.

Signed and Sealed this

Twenty-third Day of November, 2004

JON W. DUDAS
*Director of the United States Patent and Trademark Office*